United States Patent
Ishiguro

[11] Patent Number: 5,857,354
[45] Date of Patent: Jan. 12, 1999

[54] AIR-COOLED ABSORPTION-TYPE AIR CONDITIONING APPARATUS WITH VERTICAL HEAT-TRANSFER FINS

[75] Inventor: Katsusuke Ishiguro, Nagoya, Japan

[73] Assignee: Paloma Industries, Ltd., Aichi, Japan

[21] Appl. No.: 877,660

[22] Filed: Jun. 18, 1997

[30] Foreign Application Priority Data

Sep. 3, 1996 [JP] Japan .................................. 8-253889

[51] Int. Cl.⁶ ............................................. F25B 15/00
[52] U.S. Cl. .............................................. 62/476; 62/484
[58] Field of Search ........................ 62/101, 476, 484, 62/494

[56] References Cited

U.S. PATENT DOCUMENTS

| | | | |
|---|---|---|---|
| 3,990,263 | 11/1976 | Ainbinder et al. | 62/476 |
| 4,578,961 | 4/1986 | Domnick | 62/494 |
| 4,691,528 | 9/1987 | Tongu | 62/238.3 |
| 4,791,790 | 12/1988 | Tongu | 62/476 |
| 4,872,319 | 10/1989 | Tongu | 62/141 |
| 4,926,659 | 5/1990 | Christensen et al. | 62/476 |
| 5,666,818 | 9/1997 | Manrique-Valadez | 62/235.1 |

FOREIGN PATENT DOCUMENTS

6-21743   3/1994   Japan .............................. F25B 30/04

Primary Examiner—William Doerrler
Attorney, Agent, or Firm—Robin, Blecker & Daley

[57] ABSTRACT

An air-cooled absorption-type air conditioning apparatus performs both cooling and heating operations. The apparatus includes circulation pipes through which a thermal medium flows, the thermal medium being for controlling room air temperature. Further included in the apparatus are outer pipes provided concentrically and outside of sections of the circulation pipes to form chambers between the circulation pipes and the outer pipes. The outer pipes have fins on external surfaces of the outer pipes, and the fins are arranged in a substantially vertical orientation. Also included in the apparatus are a fan for circulating air over the outer pipes, first spray mechanisms for dispensing a liquid coolant over outer surfaces of the circulation pipes in the chambers formed between the circulation pipes and the outer pipes, and second spray mechanisms for dispensing an absorption liquid onto inner surfaces of the outer pipes in the chambers, the absorption liquid being for absorbing the liquid coolant.

6 Claims, 7 Drawing Sheets

AIR-COOLED ABSORPTION-TYPE AIR CONDITIONING APPARATUS WITH VERTICAL HEAT-TRANSFER FINS

FIELD OF THE INVENTION

This invention is concerned with an air-cooled absorption-type air conditioning apparatus which is able to perform both cooling and heating operations, and includes a combined evaporation-absorption chamber utilizing double tubes.

BACKGROUND OF THE INVENTION

An example of a conventional air-cooled absorption-type air conditioning apparatus is disclosed in Japanese patent Hei 6-21743. The apparatus disclosed in that patent includes a first cold/warm water heat exchanger, an outer pipe, a first spray mechanism, and a second spray mechanism. The first cold/warm water heat exchanger is formed using a portion of the circulation passage for the cold/warm water which becomes the temperature control medium in a room air-conditioning unit. The outer pipe surrounds the outer circumference of the circulation passage at a certain distance from the outer circumference of the circulation passage. The first spray mechanism sprays a liquid coolant or high-concentration liquid over the outer surface of the first cold/warm water heat exchanger. The second spray mechanism sprays a liquid coolant or high-concentration liquid over the inner surface of the outer pipe. During a cooling operation, the following steps take place. Coolant vapor flows from a low temperature regenerator to a condenser, at which the coolant vapor is condensed into a liquid coolant. Then the liquid coolant is sprayed over the outer surface of the first cold/warm water heat exchanger by the first spray mechanism, and a high-concentration liquid, which is separated at the low temperature regenerator, is sprayed onto the inner surface of the outer pipe by the second spray mechanism. Evaporation of the liquid coolant cools the water within the first cold/warm water heat exchanger. The high-concentration liquid, which is sprayed onto the inner surface of the outer pipe, absorbs the coolant vapor, thereby generating heat. The heat generated by the absorption of the coolant vapor is removed by air flowing over the outer surface of the outer pipe.

During a heating operation, the following steps take place. Coolant vapor, which is separated by a phase separator after being heated in a high temperature regenerator, exchanges heat with cold/warm water, which flows through a second cold/warm water heat exchanger in a heater. The second cold/warm water heat exchanger is formed using a portion of the cold/warm water circulation passage. Liquified coolant is sprayed onto the inner surface of the outer pipe by the second spray mechanism. The high-concentration liquid which is separated by a phase separator after being heated by the high temperature regenerator, is sprayed over the outer surface of the first cold/warm water heat exchanger by the first spray mechanism. The liquid coolant absorbs heat from the air on the outer surface on the outer pipe and evaporates as it is sprayed on to the outer surface of the first cold/warm water heat exchanger. The vapor produced by the evaporation of the liquid coolant is then absorbed by the high-concentration liquid, generating heat which warms the cold/warm water.

In the conventional air-conditioning apparatus described above, fins are placed in a horizontal orientation on the outer pipe of the evaporation-absorption unit. Water from condensation or rain tends to get trapped between the horizontal fins. For example, during a heating operation, condensation occurs on the fins because the outer pipe is chilled when the liquid coolant on the inner surface of the outer pipe evaporates. The condensation is likely to remain between the fins and in some conditions may freeze to form frost. The condensation or frost prevents air, blown by a fan, from efficiently transmitting heat to the fins. In addition, water from rain or condensation tends to corrode the fins and the outer pipe, adversely affecting the reliability and the durability of the apparatus.

OBJECTS AND SUMMARY OF THE INVENTION

It is an object of the invention to provide an absorption-type air conditioning apparatus which is more efficient and durable than apparatus of conventional design.

It is a more specific object of the invention to provide an air conditioning apparatus in which condensation or rain does not accumulate on heat-exchange fins provided on an evaporation-absorption unit.

According to an aspect of the invention, there is provided an air-cooled absorption-type air conditioning apparatus for performing both cooling and heating operations, the apparatus including circulation pipes through which a thermal medium flows, the thermal medium being for controlling room air temperature; outer pipes provided concentrically and outside of sections of the circulation pipes to form chambers between the circulation pipes and the outer pipes, the outer pipes having fins on external surfaces of the outer pipes, the fins being arranged in a substantially vertically orientation; a fan for circulating air over the outer pipes; first spray mechanisms for dispensing a liquid coolant over outer surfaces of the circulation pipes in the chambers formed between the circulation pipes and the outer pipes; and second spray mechanisms for dispensing an absorption liquid onto inner surfaces of the outer pipes of the chambers, the absorption liquid being for absorbing liquid coolant.

Further in accordance with the invention, the first spray mechanisms are preferably positioned in the chambers above the circulation pipes and extending parallel to a longitudinal axis of the circulation pipes, and the second spray mechanisms include a pair of spray pipes in each of the chambers extending parallel to the longitudinal axis of the circulation pipes, a first pipe of each pair of spray pipes being disposed above a central axis of the respective circulation pipe and to one side of the respective circulation pipe, and the other pipe of the pair of spray pipes being disposed above the central axis of the respective circulation pipe and to an opposite side of the respective circulation pipe relative to the first pipe. Furthermore, preferably the first and second spray pipes of each pair are disposed proximate to respective opposite sides of the internal surface of the respective outer pipe.

Because the heat-exchange fins provided on the outer pipes of the evaporation-absorption unit are arranged vertically, water from rain or condensation is removed quickly. Hence, transfer of heat to the fins can always be performed efficiently, and corrosion of the fins and the outer pipes is prevented.

DESCRIPTION OF PREFERRED EMBODIMENTS

An embodiment of an air-cooled absorption-type air conditioning apparatus provided in accordance with the invention will now be described, initially with reference to FIG. 1.

The air-conditioning apparatus shown in FIG. 1 includes a high temperature regenerator 10, a high temperature regenerator phase separator 11 (hereinafter, referred to as to a "high temperature separator"), a low temperature regenerator 20, a low temperature regenerator phase separator 21 (hereinafter referred to as "low temperature separator"), a condenser 30, a double tube section 40 (which operates as an evaporation-absorption unit), and a fan 50.

In the high temperature regenerator 10, a burner 1 heats a low-concentration lithium bromide aqua solution (hereinafter referred to as a "low-concentration liquid"), as the low-concentration liquid flows through a fin-tube-type heat exchanger 10a. The high temperature separator 11 separates the low-concentration liquid heated by the high temperature regenerator 10 into steam or coolant vapor and a medium-concentration lithium bromide aqua solution (hereinafter referred to as the "medium-concentration liquid"). The low temperature regenerator 20 re-heats the medium-concentration liquid as it flows within a fin-tube-type heat exchanger 20a by using the steam or coolant vapor produced at the high temperature separator 11. The low temperature separator 21 separates the medium-concentration liquid heated by the low temperature regenerator 20 into steam or coolant vapor and a high-concentration lithium bromide aqua solution (hereinafter referred to as the "high-concentration liquid").

The condenser 30 cools and liquefies the steam or coolant vapor produced at the low temperature separator 21. The fan 50 directs air to the condenser 30 and the double tube section 40. Furthermore, the condenser 30, the double tube section 40 and the fan 50 are contained in a case 51 in the order stated in this sentence. The case 51 contains vents 51a and 51b respectively located adjacent to the condenser 30 and the fan 50.

Figure 2:
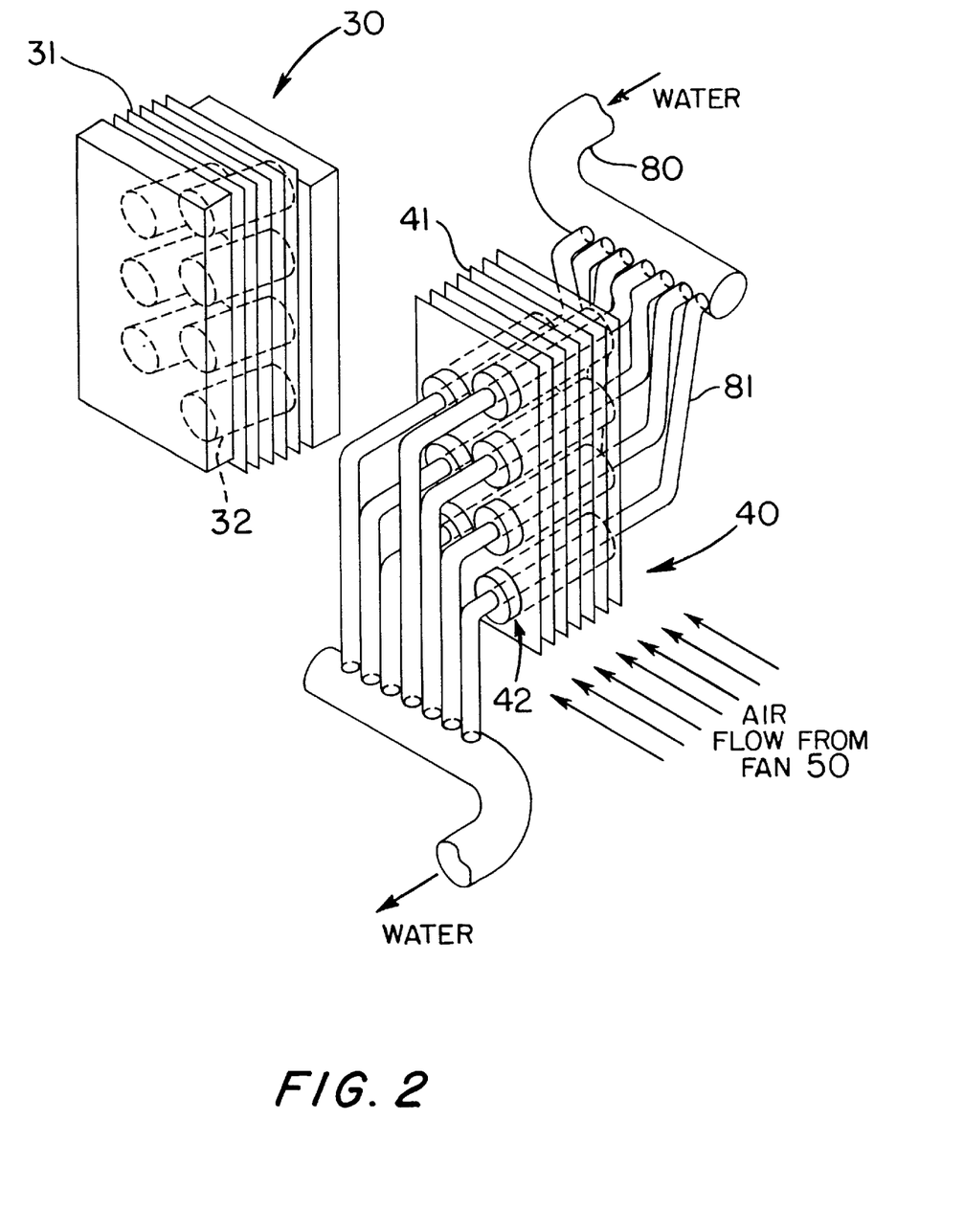
FIG. 2 illustrates the condenser and the double tube (evaporation-absorption) portions of the apparatus of FIG. 2.

As seen from FIG. 2, the condenser 30 and the double tube section 40 are respectively equipped with fins 31 and 41 placed on the outer surface of the condenser and the double tube section. The fins are provided to improve the efficiency with which the condenser 30 and the double tube section 40 are cooled by air directed toward the condenser and the double tube section by the fan 50. The fins 31 and 41 are placed in a vertical orientation. The fins are housed in the case 51 in an air-tight manner so that all of the air directed by the fan 50 flows over the fins.

Figure 1:
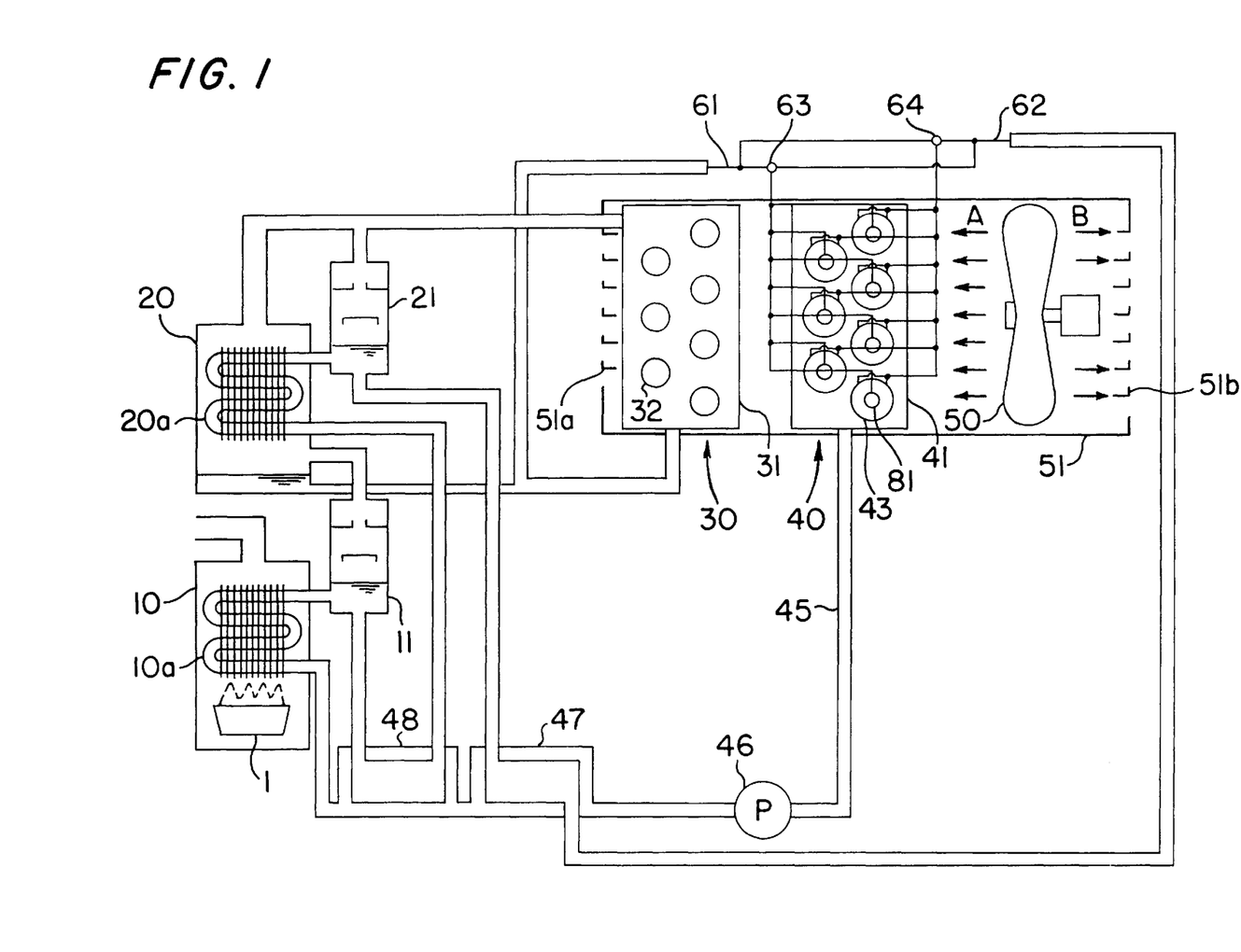
FIG. 1 is a schematic representation of an absorption-type air conditioning apparatus provided in accordance with the invention.

When the fan 50 directs the air in the direction indicated by arrow A in FIG. 1, air is introduced into the case 51 from outside of the case 51 via the vents 51b. The air drawn into the case 51 by the fan 50 passes over the fins 41 and 31 and then exits from the case 51 via the vents 51a.

On the other hand, when the fan 50 directs the flow of air in the direction indicated by the arrow B, air is introduced into the case 51 from outside of the case via the vents 51a. In this situation, the air drawn into the case 51 by the fan 50 passes over the fins 31 and 41 and then exits from the case 51 via the vents 51b.

Figure 3:
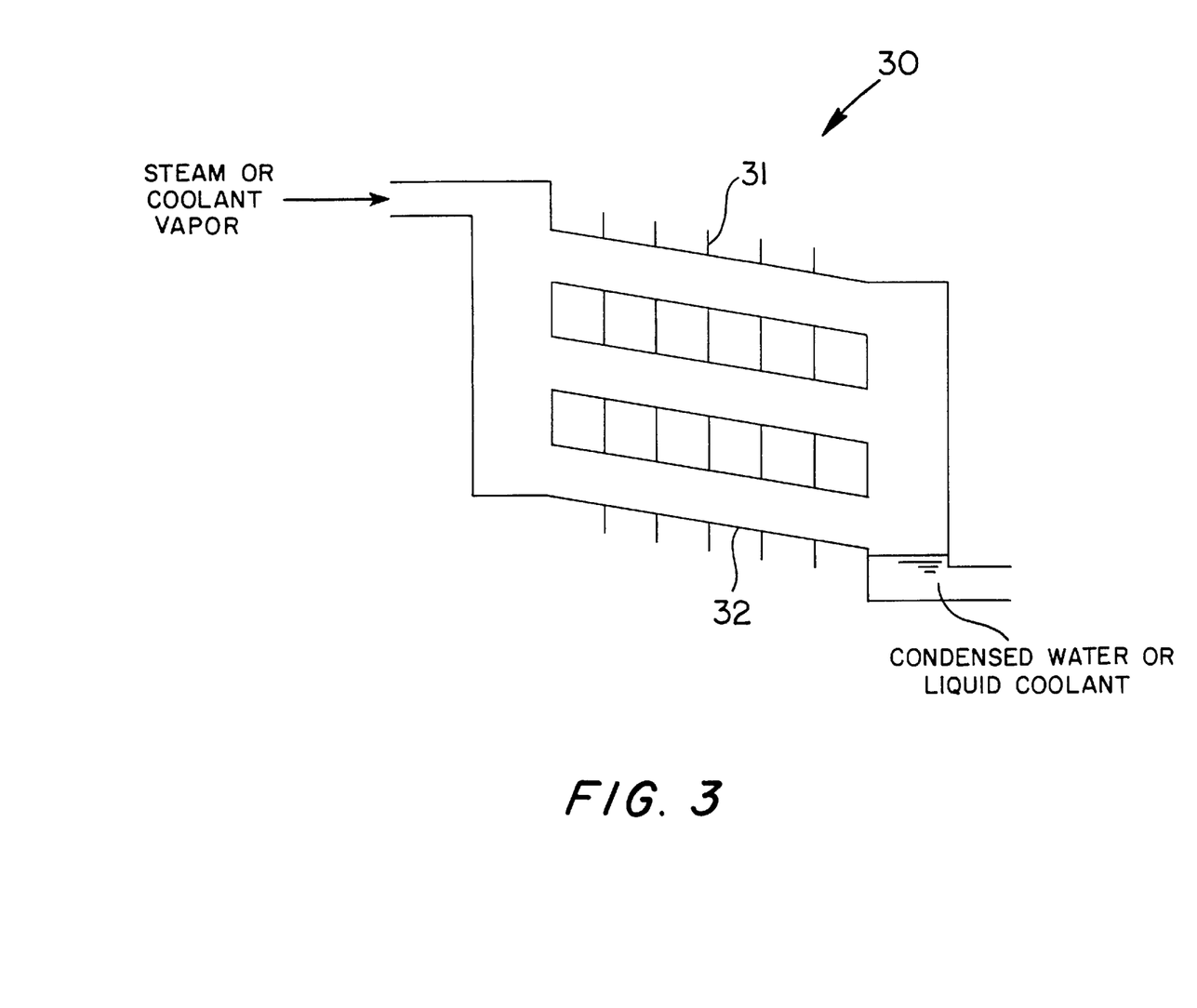
FIG. 3 is a schematic cross-sectional view illustrating details of the condenser of FIG. 2.

Referring again to FIG. 2, the apparatus provided in accordance with the invention includes a water pipe 80. Water circulating through the water pipe 80 cools or heats air at a room unit, which is not shown. The room unit performs cooling and heating operations by circulating air which has been adjusted in temperature by water which circulates in the water pipe 80. The water pipe 80 branches into a plurality of parallel pipes 81, as shown in FIG. 2, and the parallel pipes 81 pass through the double tube section 40 before merging together on the opposite side of the double tube section 40. The condenser 30 includes condensation pipes 32 in which steam or coolant vapor is cooled and liquified as it passes through the pipes 32. As seen from FIG. 3, the condensation pipes 32 slope downward in the direction of circulation of the steam/coolant vapor/water/coolant so that the water or coolant produced by condensation flows smoothly toward an outlet of the condenser 30.

Figure 4:
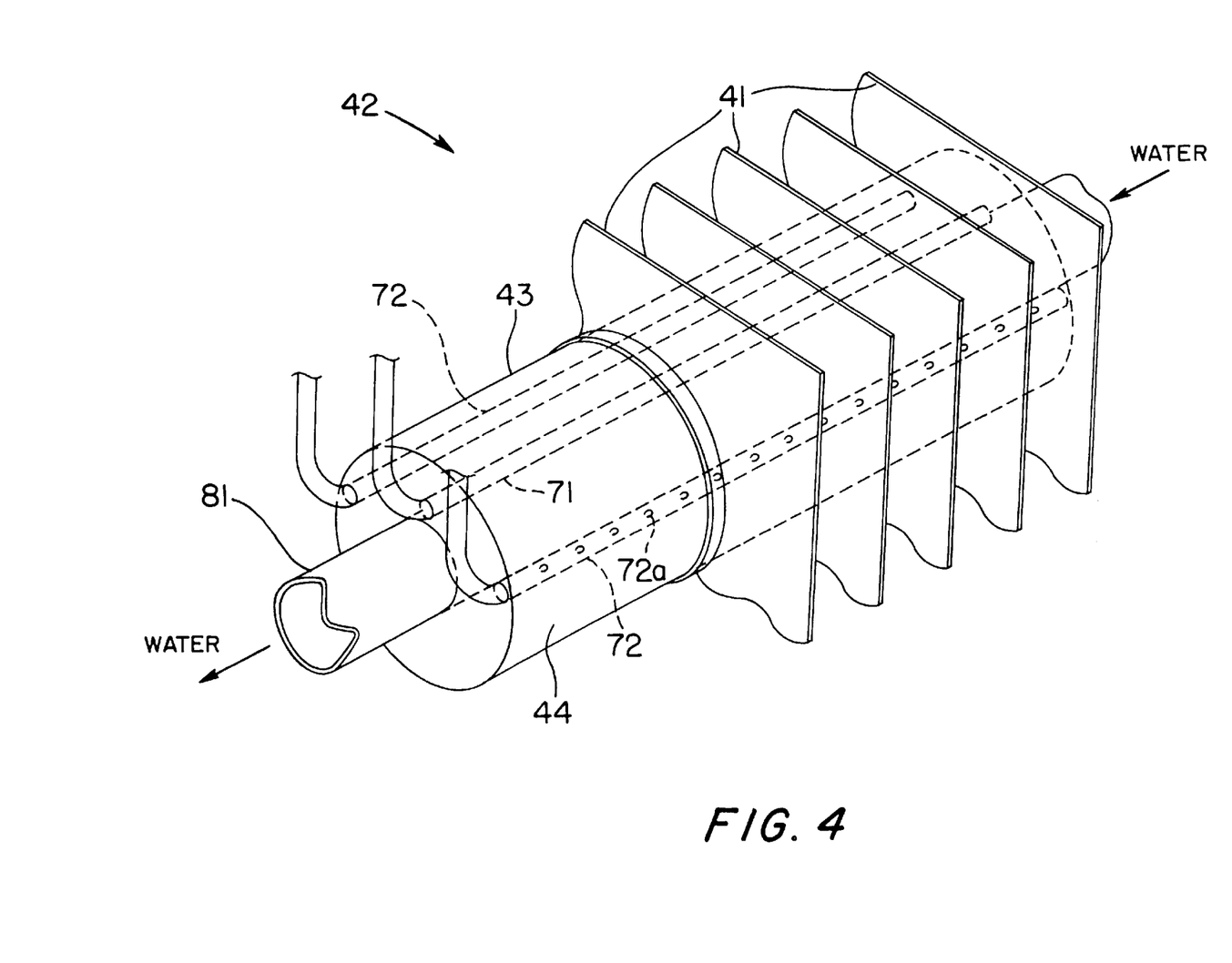
FIG. 4 is a partial isometric view illustrating details of the double tube unit of FIG. 2.

Details of the double tube section 40 will now be described with reference to FIG. 4, which shows one of the double tube units 42 which make up the double tube section 40. Also shown in FIG. 4 are fins 41 associated with each of the double tube units 42. As seen from FIG. 4, each of the double tube units 42 includes one of the above-mentioned parallel pipes 81, as well as a corresponding outer pipe 43. The outer pipes 43 are each formed concentrically around the outer circumference of the corresponding parallel pipe 81. Evaporation-absorption chambers 44 are formed between the parallel pipes 81 and the outer pipes 43. Each of the evaporation-absorption chambers 44 includes a first spray pipe 71 and two second spray pipes 72. The first spray pipe 71 runs along the outer surface of the parallel pipe 81, parallel to the longitudinal axis of the parallel pipe 81 and just above the parallel pipe 81. The two second spray pipes 72 are also arranged in parallel to the longitudinal axis of the parallel pipe 81 and are positioned adjacent to the inner surface of the outer pipe 43. One of the two spray pipes 72 is displaced to one side of the pipe 43, and the other of the pipes 72 is displaced to an opposite side of the pipe 43. Both of the pipes 72 are positioned slightly above the central axis of the parallel pipe 81 (as best seen from FIG. 5).

The first spray pipe 71 has spray holes 71a at its bottom surface, and dispenses water or the high-concentration liquid onto the outer surface of the parallel pipe 81 via the spray holes 71a. The second spray pipes 72 have spray holes 72a which face the inner surface of outer pipe 43. The second spray pipes 72 dispense water or a high-concentration liquid onto the inner surface of the outer pipe 43. The inner surface of the outer pipes 43 is provided with a special surface treatment structure such as very fine grooves or a mesh. Because of this surface structure at the inner surface of the pipes 43, the water or high-concentration liquid not only flows downward on the inner surface of the pipes 43, but also spreads upward along the inner surface of the outer pipes 43 because of surface tension in the water or high-concentration liquid.

Figure 6:
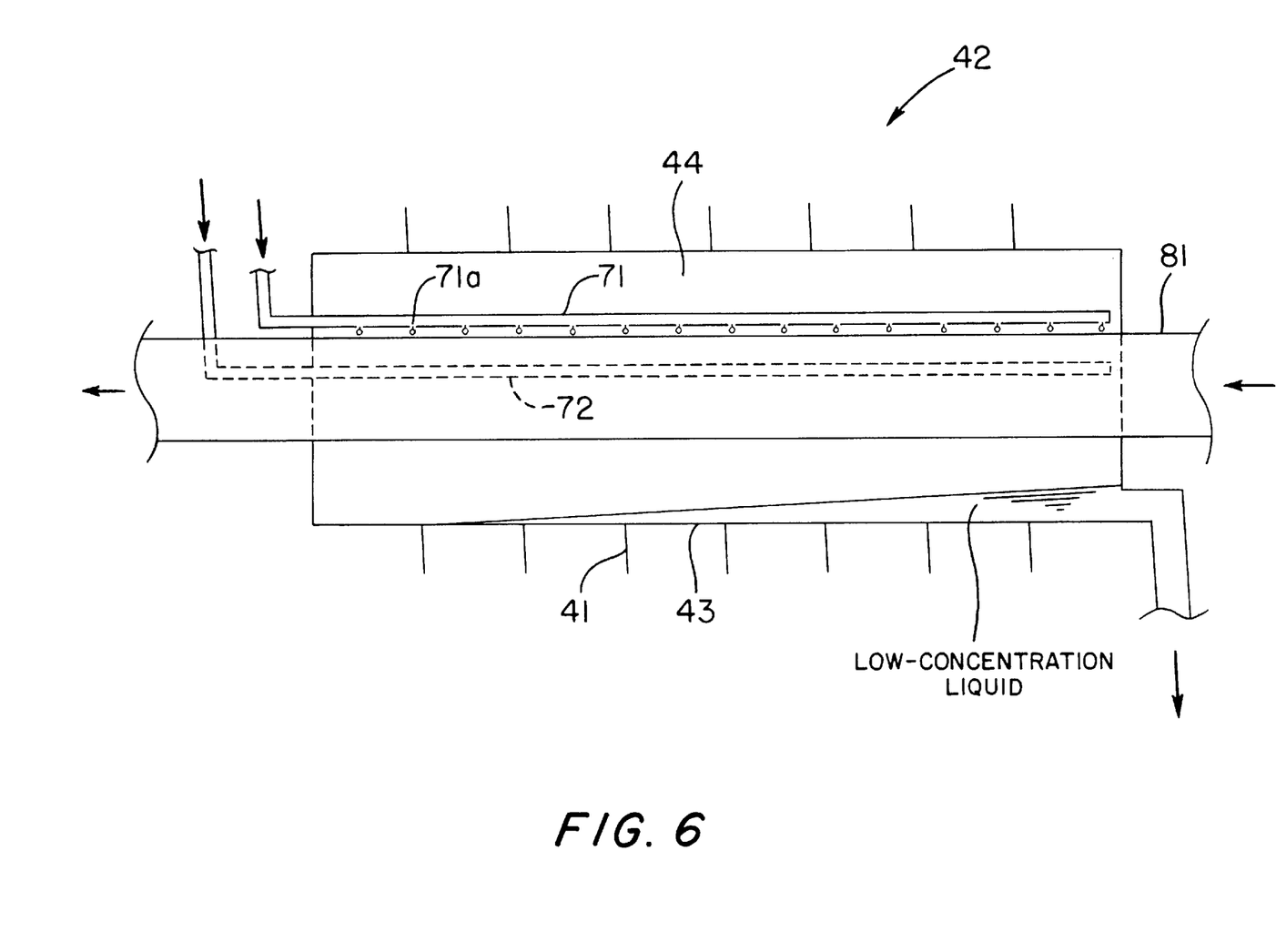
FIG. 6 is another cross-sectional view of the double tube arrangement of FIG. 4, taken along the longitudinal axis of the double tube.

As illustrated in FIG. 6, the first spray pipe 71 has a plurality of the spray holes 71a spaced along the length of the first spray pipes 71 so that water or high-concentration liquid is dispensed along the entire length of the evaporation-absorption chamber 44. Similarly, the second spray pipes 72 have their holes 72a spaced along the length of the pipes 72 so that the water or the high-concentration liquid is dispensed on the inner surface of the pipe 43 along the entire length of the evaporation-absorption chamber 44. Furthermore, each of the double tube units 42 slopes downwardly so that the low high-concentration liquid flows smoothly after it accumulates at the bottom of the evaporation-absorption chamber 44. This allows for effective use of the inner surface area of the outer pipes 43.

Referring once more to FIG. 1, a circulation pump 46 is provided in a liquid circulation passage 45 which connects the outlet of the evaporation-absorption chambers 44 to the inlet of the high temperature regenerator 10. The circulation pump 46 circulates the low concentration liquid from the evaporation-absorption chambers 44 to the high temperature regenerator 10. A low temperature heat exchanger 47 and a high temperature heat exchanger 48 are also provided on the liquid circulation passage 45 between the evaporation-absorption chambers 44 and the high temperature regenerator 10. The low temperature heat exchanger 47 allows heat to be exchanged between a high-concentration liquid produced at the low temperature separator 21 and the low concentration liquid flowing toward the high temperature regenerator 10. Similarly, the high temperature heat exchanger 48 allows heat to be exchanged between the medium-concentration liquid produced from the high temperature separator 11 and the low-concentration liquid flowing toward the high temperature regenerator 10.

Figure 7:
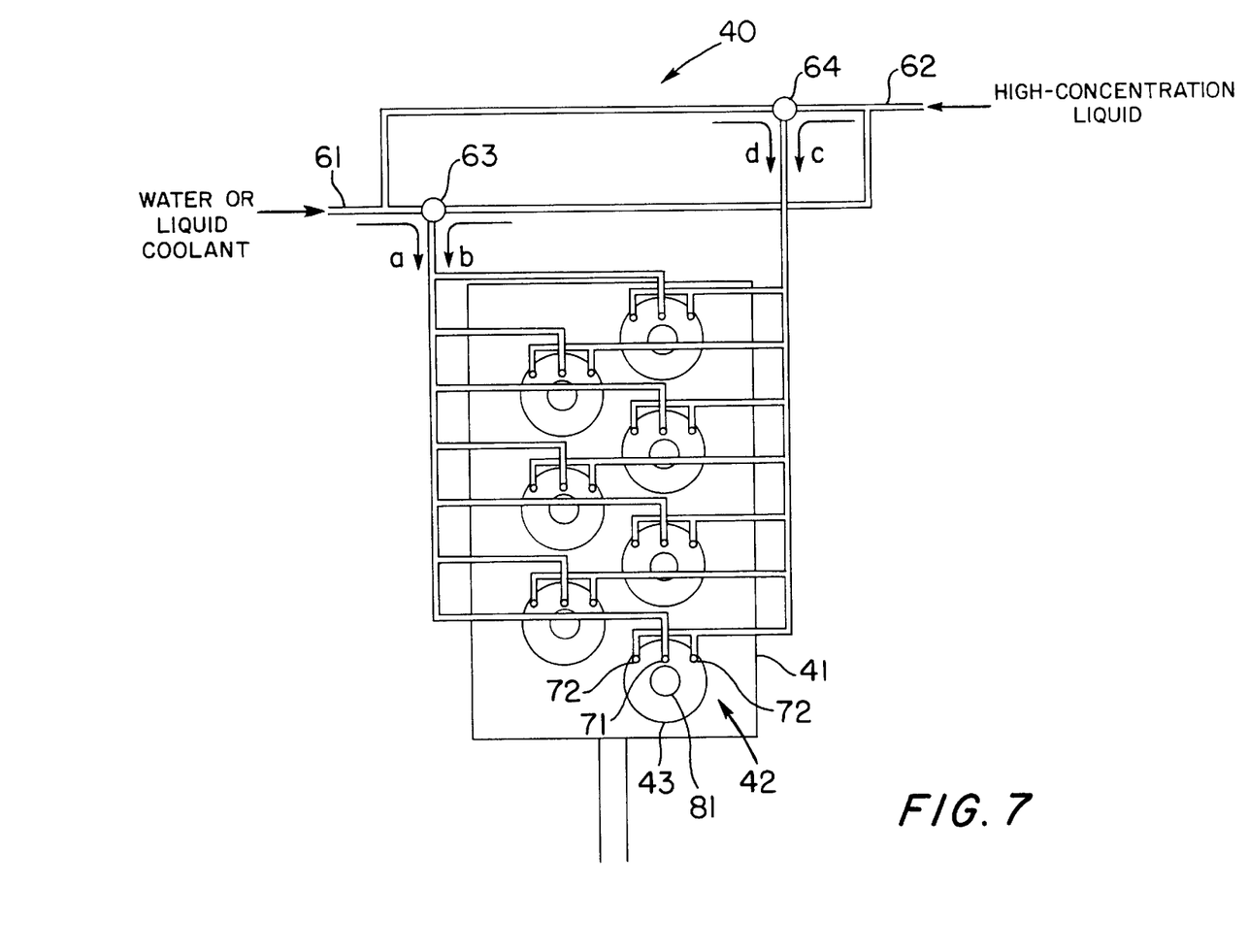
FIG. 7 illustrates switchable fluid flow paths provided in connection with the double tube unit.

FIG. 7 illustrates how a water or liquid coolant passage 61 and a high concentration liquid passage 62 are connected to each of the double tube units 42 of the double tube section 40. The water or liquid coolant passage 61 connects the outlet of the condenser 30 to the inlet of the evaporation-absorption chambers 44. The high-concentration liquid passage 62 connects the outlet of the low temperature heat exchanger 47 to the inlet of the evaporation-absorption chambers 44. After respectively branching into two passages, the water or liquid coolant passage 61 and the high-concentration liquid passage 62 are both connected to the evaporation-absorption chambers 44 through a first three-way valve 63 and a second three-way valve 64. The first three-way valve 63 is connected to inlets of the first spray pipes 71 of the double tube units 42. When the three-way valve 63 is in a first position, liquid is allowed to flow from the passage 61 in the manner indicated by arrow a so that the first spray pipes 71 dispense water or liquid coolant onto the outer surface of the parallel pipes 81. When the first three-way valve 63 is in a condition to permit fluid flow as indicated by the arrow b, the first spray pipes 71 dispense the high-concentration liquid onto the outer surface of the parallel pipes 81.

The second three-way valve 64 is connected to the inlets of the second spray pipes 72 of the double tube units 42. When the second three-way valve 64 is in a position to permit fluid flow as indicated by arrow c, the second spray pipes 72 dispense the high-concentration liquid onto the inner surface of the outer pipes 43. When the second three-way valve 64 is in a position to permit fluid flow as indicated by the arrow d, the second spray pipes 72 dispense water or liquid coolant onto the inner surface of the outer pipes 43.

Operation of the air-cooled absorption-type air conditioning apparatus in a cooling mode will now be explained.

During cooling operations, the first three-way valve 63 is positioned to permit fluid flow as indicated by arrow a, and the second three-way valve 64 is positioned to permit fluid flow as indicated by the arrow c. The fan 50 (FIG. 1) directs a flow of air in the direction from the double tube section 40 to the condenser 30 (as indicated by arrow A) to cool the double tube section 40 and the condenser 30. The burner 1 heats the low-concentration liquid which flows through fin-tube-type heat exchanger 10a of the high temperature regenerator to generate steam or coolant vapor. The high temperature separator 11 separates the low concentration liquid into steam or coolant vapor and a medium concentration liquid. The medium concentration liquid flows to the low temperature regenerator 20 after having its temperature reduced at the high temperature heat exchanger 48. The medium high-concentration liquid is then reheated by the steam or coolant vapor produced at the high temperature separator 11 as the medium-concentration liquid flows through the fin-tube-type heat exchanger 20a. The medium-concentration liquid is then separated into steam or coolant vapor and high-concentration liquid at the low temperature separator 21. After the temperature of the high-concentration liquid is reduced at the low temperature heat exchanger 47, the high-concentration liquid is dispensed onto the inner surface of the outer pipes 43. The steam or coolant vapor is cooled and condensed at the condenser 30 to form water or liquid coolant. The water or liquid coolant is then dispensed onto the outer surface of the parallel pipes 81 in the evaporation-absorption chambers 44. Because the pressure in the evaporation-absorption chambers is low, the dispensed water or liquid coolant evaporates to remove heat from the water circulating in the parallel pipes 81, thereby cooling the water in the pipes 81. The room unit (not shown) performs a cooling operation by using the cooled water circulating in the water pipe 80.

The water or liquid coolant which evaporates in the evaporation-absorption chambers is immediately absorbed by the high-concentration liquid, thereby releasing heat at the inner surface of the outer pipes 43. The released heat is removed from the pipes 43 by air driven by the fan 50.

By absorbing the evaporated water or liquid coolant, the high-concentration liquid becomes a low-concentration liquid. The circulation pump 46 circulates the low-concentration liquid to the high temperature regenerator 10 via the low temperature heat exchanger 47 and the high temperature heat exchanger 48. The low-concentration liquid is successively heated as it passes through the low temperature heat exchanger 47 and the high temperature heat exchanger 48, on the way to the high temperature regenerator 10.

Operation of the air conditioning apparatus in a heating mode will now be explained. During heating operations, the first three-way valve 63 is positioned to permit fluid flow as indicated by arrow b, and the second three-way valve 64 is positioned to permit fluid flow as indicated by the arrow d. The fan 50 runs in an opposite direction to that of the cooling operation, so that air driven by the fan 50 flows in the direction indicated by arrow B from the condenser 30 to the pipes 43.

Water or liquid coolant from the condenser 30 is dispensed onto the inner surface of the pipes 43 in the evaporation-absorption chambers 44, where the water or liquid coolant evaporates because the pressure in the evaporation-absorption chambers is low. The evaporation process removes heat from the outer pipes 43 so that the outer pipes 43 are cooled. The outer pipes 43 are prevented from overcooling because the heat generated by the condenser 30 is transferred to the pipes 43 by the flow of air caused by the air fan 50. When the warm air from the condenser 30 is cooled over the fins 41 on the pipes 43, condensation tends to form on the fins 41. However, the condensation is removed quickly because the fins 41 are vertically oriented.

The water vapor or coolant vapor in the evaporation-absorption chambers 44 is immediately absorbed by the high concentration liquid on the outer surface of the parallel pipes 81. The absorption process generates heat which warms the water circulating in the parallel pipes 81. The room unit performs a heating operation using the warm water circulating in the water pipe 80.

The air-cooled absorption-type air conditioning apparatus of the present invention has the following advantages. The fins 31 and 41 on the condenser 30 and the double pipe section 40 are oriented vertically so that water from rain or condensation is prevented from accumulating between the fins. Accordingly, heat is always transferred efficiently at the fins and corrosion is prevented, which improves the reliability of the apparatus.

The first spray pipes 71 are positioned above and quite near the parallel pipes 81, and dispense water or high-concentration liquid along the entire length of the parallel pipes 81. Therefore, substantially the entire outer surface of the parallel pipes 81 is utilized for cooling and heating operations.

Figure 5:
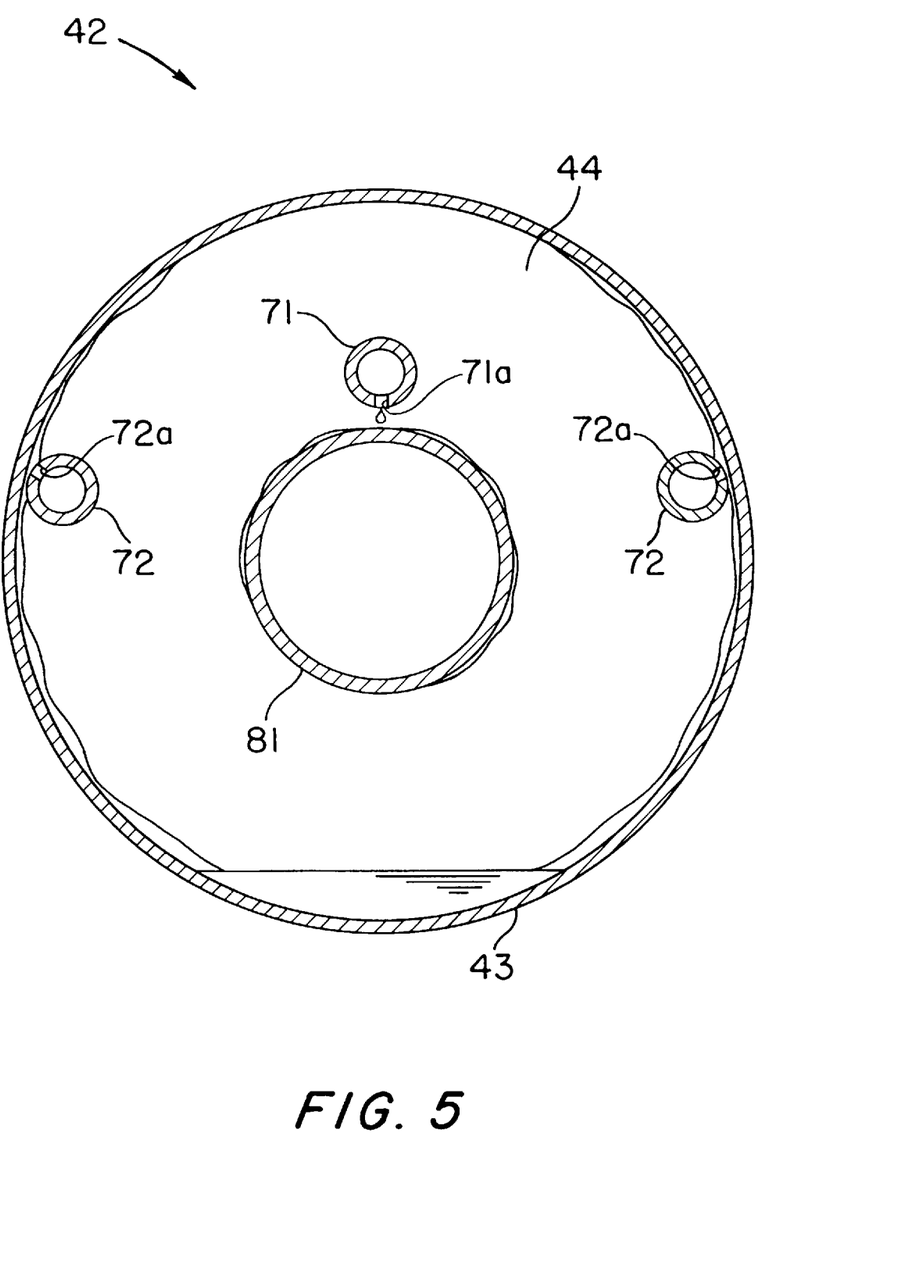
FIG. 5 is a cross-sectional view of the double tube arrangement of FIG. 4, taken transversely to a longitudinal axis of the double tube.

Also, the second spray pipes 72 are positioned above the central axis of the outer pipe 43 and at opposite sides of the inner surface of the outer pipe 43, and dispense water or high-concentration liquid along the entire length of the outer pipe 43. Consequently, more than half of the inner surface of the outer pipes 43 is effectively used for cooling and heating operations. As a result, the air-conditioning capacity of the apparatus is quite high.

The operating efficiency and capacity of the evaporation-absorption chambers is further enhanced by the special surface treatment on the inner surface of the outer pipes 43, which allows water or high-concentration liquid dispensed from the second spray pipes 72 to spread upward along the inner surface of the outer pipes 43. In addition, the downward slope of the double tube 42 reduces the amount of low-concentration liquid accumulated in the evaporation-absorption chambers 44, which also tends to permit a large proportion of the inner surface of the outer pipes 43 to be utilized for cooling and heating operations. Thus, even sections of the inner surface of the outer pipes 43 where water or high-concentration liquid is not dispensed contribute to the process of heat transfer for cooling and heating operations as the sections of the pipes 43 are cooled or warmed by the flow of air driven by the fan 50. These features of the evaporation-absorption chambers 44 promote high efficiency.

During cooling operations, priority is given to cooling the outer pipes 43 in that the fan 50 directs the air flow first to the double section 40 and then to the condenser 30. On the other hand, during heating operations, the outer pipes 43 are prevented from overcooling and freezing by heat generated at the condenser 30 and transferred to the outer pipes 43 by a flow of air directed by the fan 50 from the condenser 30 to the double tube section 40.

The fins 31 and 41 provided on the condenser 30 and the double tube section 40 are housed within the case 51 in an air-tight manner so that the air directed by the air 50 flows over the fins 31 and 41. Consequently, even when the fan changes the direction of air flow as required for heating operations, all of the external air introduced through the vents 51a flows from the fins 31 of the condenser 30 to the fins 41 of the double tube section 40. This provides for excellent efficiency in heating operations.

In addition, the apparatus exhibits a simple design, in which costs are reduced by switching between heating and cooling operations by reversing the direction of rotation of the fan 50. The design of the evaporation-absorption chambers 44 is also simple, in that the chambers are formed between the parallel pipes 81 and the outer pipes 43, so that the structure as a whole is simple in construction, and the entire apparatus is relatively small, light, and inexpensive to produce.

The evaporation of the water or the liquid coolant, and the absorption of the resulting vapor into the high-concentration liquid, take place smoothly between facing surfaces within the evaporation-absorption chambers 44. In addition, the parallel pipes 81 are cooled or heated over substantially the entire circumference of the pipes. Both of these design features are conducive to high operating efficiency. Further, separate multiple evaporation-absorption chambers 44 are provided independently, so that the volume of each chamber can be decreased, and the wall thickness required to withstand the low pressure within the chambers is reduced.

The air-conditioning apparatus disclosed herein uses fin-tube-type heat exchangers in the high and low temperature regenerators instead of the conventional boiler-type structure, so that the apparatus requires a smaller amount of liquid coolant-absorption medium solution than conventional apparatus. Therefore, the absorption medium solution can be warmed up faster than in conventional apparatus, and the present apparatus commences operation more quickly. Also, the overall weight of the apparatus is reduced. Further, the fin-type heat exchangers provide for efficient heating of the liquids.

Both the high and low temperature separators 10a and 20a in the high and low temperature regenerators are formed so as to have identical structures so that the cost of producing the apparatus can be reduced.

In the embodiment described above, a double effect absorption cycle is used, but it is contemplated to use instead a single effect absorption cycle. The regenerators can be also be formed with a liquid-storage-boiler structure.

The shape of the concentric double tube is not restricted to cylinders having circular cross-sections. For example, concentric tubes having polygonal cross-sections may be used. In addition, other coolants and absorption media than water and lithium bromide may be used.

Various changes to the foregoing embodiments may be introduced without departing from the invention. The particularly preferred embodiments are thus intended in an illustrative and not limiting sense. The true spirit and scope of the invention is set forth in the following claims.

What is claimed is:

1. An air-cooled absorption-type air conditioning apparatus for performing both cooling and heating operations, the apparatus comprising:

circulation pipes through which a thermal medium flows, said thermal medium for controlling room air temperature;

outer pipes provided concentrically and outside of sections of said circulation pipes to form chambers between said circulation pipes and said outer pipes, said outer pipes having fins on external surfaces of said outer pipes, said fins being arranged in a substantially vertical orientation;

a fan for blowing air over said outer pipes;

first spray mechanisms for dispensing a liquid coolant over outer surfaces of said circulation pipes in the chambers formed between said circulation pipes and said outer pipes; and second spray mechanisms for dispensing an absorption liquid onto inner surfaces of said outer pipes in said chambers, said absorption liquid for absorbing said liquid coolant.

2. An air-conditioning apparatus according to claim 1, wherein:

said first spray mechanisms are positioned in said chambers above said circulation pipes and extending parallel to a longitudinal axis of said circulation pipes; and said second spray mechanisms include a pair of spray pipes in each of said chambers extending parallel to said longitudinal axis of said circulation pipes, a first pipe of each pair of spray pipes disposed above a central axis of the respective circulation pipe and to one side of the respective circulation pipe and the other pipe of said each pair of spray pipes disposed above said central axis of the respective circulation pipe and to an opposite side of the respective circulation pipe relative to said first pipe.

3. An air conditioning apparatus according to claim 2, wherein said first and second spray pipes are disposed proximate to respective opposite sides of the internal surface of the respective outer pipe.

4. An air-cooled absorption-type air conditioning apparatus for performing both cooling and heating operations, the apparatus comprising:

circulation pipes through which a thermal medium flows, said thermal medium for controlling room air temperature;

outer pipes provided concentrically and outside of sections of said circulation pipes to form chambers between said circulation pipes and said outer pipes;

a fan for blowing air over said outer pipes;

first spray mechanisms for dispensing a liquid coolant over outer surfaces of said circulation pipes in the chambers formed between said circulation pipes and said outer pipes; and second spray mechanisms for dispensing an absorption liquid onto inner surfaces of said outer pipes and said chambers, said absorption liquid for absorbing said liquid coolant;

said first spray mechanisms being positioned in said chambers above said circulation pipes and extending parallel to a longitudinal axis of the circulation pipes; and said second spray mechanisms including a pair of spray pipes in each of said chambers extending parallel to said longitudinal axis of the circulation pipes, a first pipe of each pair of spray pipes disposed above a central axis of the respective circulation pipe and to one side of the respective circulation pipe, and the other pipe of said each pair of spray pipes disposed above said central axis of the respective circulation pipe and to an opposite side of the respective circulation pipe relative to said first pipe.

5. An air conditioning apparatus according to claim 4, wherein said first and second spray pipes are disposed proximate to respective opposite sides of the internal surface of the respective outer pipe.

6. An air conditioning apparatus according to claim 1, wherein said outer pipes are oriented substantially horizontally.

* * * * *